Sept. 26, 1939.     K. PAPELLO     2,174,330
APPARATUS FOR GUNNERY CALCULATORS
Filed Feb. 25, 1938
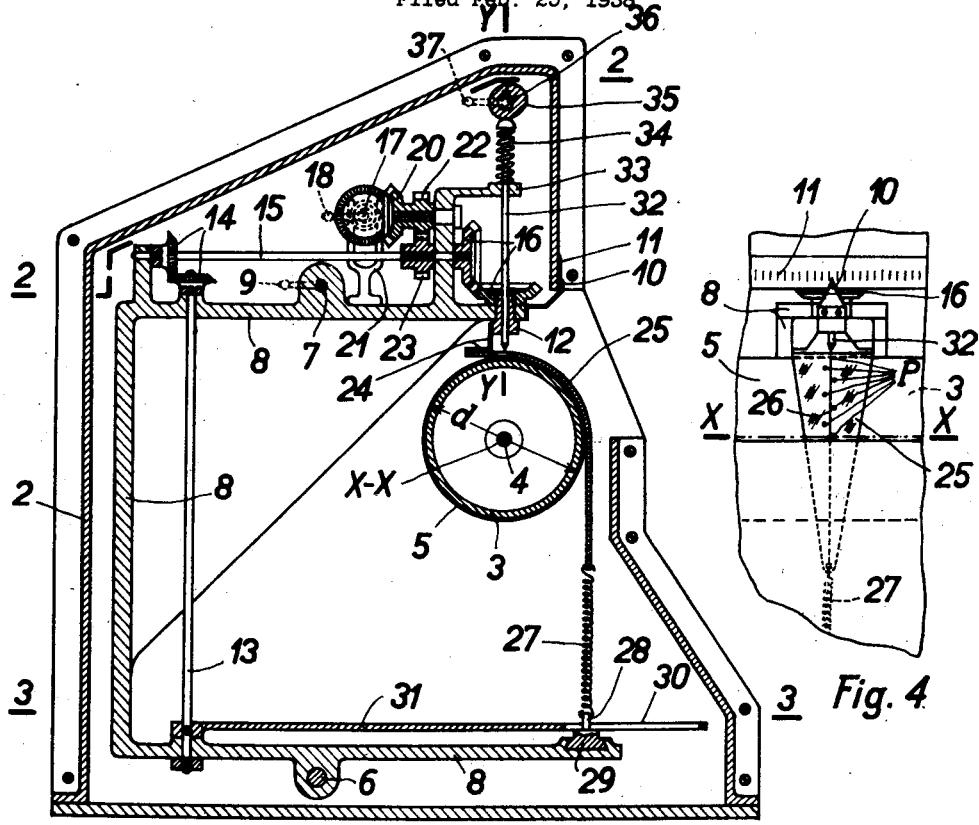
Fig. 4
Fig. 1
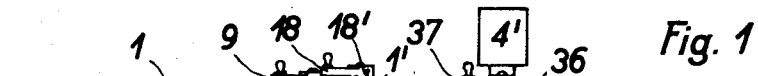
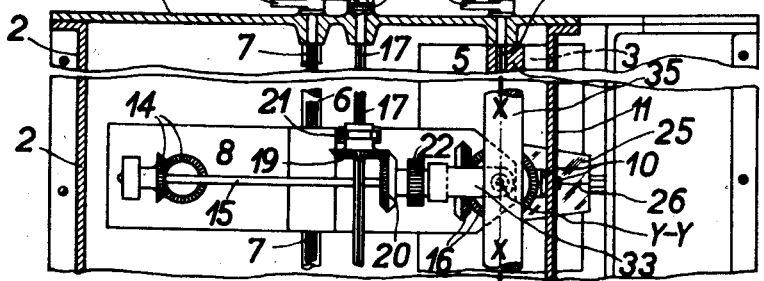
Fig. 2
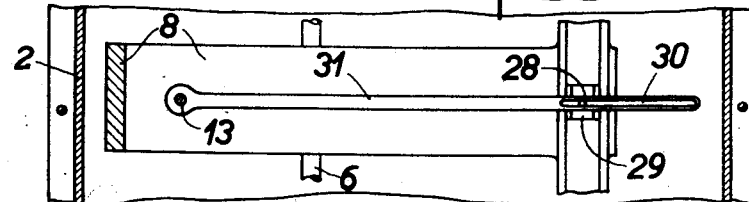
Fig. 3
Inventor:
Karl Papello.

Patented Sept. 26, 1939

2,174,330

UNITED STATES PATENT OFFICE 2,174,330

APPARATUS FOR GUNNERY CALCULATORS

Karl Papello, Jena, Germany, assignor, by mesne assignments, to Bausch & Lomb Optical Company, Rochester, N. Y., a corporation of New York Application February 25, 1938, Serial No. 192,640
In Germany March 23, 1937

3 Claims. (Cl. 33—1)

I have filed an application in Germany, March 23, 1937.

It is often desired in gunnery calculators to record on the cylindrical surface of a drum any such lines as are straight in the development of this surface in a plane, said lines being used, for instance, for the determination of the positions of tangents to curves on the cylindrical surface or for the determination of the position of a line approaching as nearly as possible a number of consecutive points on said surface. The latter case applies, for instance, to recording apparatus in which the drum is actuated in such a manner as to effect rotations about its axis and which have a stylus marking points on the cylindrical surface of the drum and adjustable by means of a slide relatively to the drum in the direction of the drum axis.

The invention solves this problem by using a rule which is pliable on the cylindrical surface and adjustable relatively to the drum.

The rule can be, e. g., a thread or a wire. The means for moving the rule on the drum are simplest when the rule is a flexible blade that can be flattened and bears a line which is straight when the blade is planar. The blade is to be of transparent material permitting adjustment of said line relative to the points or lines on the cylindrical surface of the drum. The rule can be as well, for instance, a combination of steel blades and wires.

The necessary pliableness with respect to the drum surface is obtained, regardless of the movements of the rule relative to the drum, when the used rule is either elastic itself or connected to a tightening device.

When the recording apparatus is of said construction, it is advisable to use as a rule a blade which is of the kind described and so mounted on the slide carrying the stylus as to be rotatable about an axis containing the point of the stylus and intersecting at right angles both the tangent to the line on the blade and the drum axis.

Figures 1 to 4 of the accompanying drawing, which illustrates the invention, show a constructional example of an apparatus for recording at different times the range between a target and a rangefinder. Figure 1 represents a section through the apparatus, at right angles to the axis of the recording drum; Figures 2 and 3 show sections through the section lines indicated in Figure 1; and Figure 4 is a side view.

The shaft 4 of a cylindrical drum 3 is mounted for rotation about an axis X—X in the two side walls 1 of the housing 2. The drum 3 is uniformly rotatable by a motor 4' (cf. Figure 2). The cylindrical surface 5 of the drum 3 is a plotting surface. A slide 8 is displaceable in the housing 2 in the direction of the axis X—X by means of a shaft 6 and a threaded spindle 7 having a crank 9. The position of the slide 9 relative to the drum 3 is indicated by an index 10 fast with this slide and a scale 11 provided on the housing 2 and divided to represent ranges. On the slide 8 are mounted a bushing 12 rotatable about an axis Y—Y intersecting the axis X—X at right angles and a shaft 13 rotatable about an axis parallel to the axis Y—Y. A pair of bevel wheels 14, a shaft 15 and a pair of bevel wheels 16 couple the shaft 13 to the bushing 12 in such a manner that a rotation of this bushing 12 entails the same rotation of the shaft 13 in the same sense. The bushing 12 is rotatable by a crank 18 and a grooved shaft 17 mounted in the two side walls 1 of the housing 2. An index 18' on the crank 18 indicates on a graduation 1' provided on the respective side wall 1 the position of the shaft 17 relative to the housing 2 and, accordingly, the position of the bushing 12 relative to the slide 8. On the grooved shaft 17 is displaceable a bevel wheel 19 in mesh with a bevel wheel 20 rotatably mounted on the slide 8, a catch 21 fast with the slide 8 and engaging by means of a fork the nave of the bevel wheel 19 keeping the bevel wheels 19 and 20 in mesh, regardless of what position the slide 8 assumes relatively to the drum 3. The bevel wheel 20 has a spur gearing 22 in mesh with a spur gear wheel 23 keyed on the shaft 15. To the bushing 12 is fixed by means of an angle iron 24 a thin, plane and pliable Celluloid rule 25 having a longitudinal line 26 intersecting the axis Y—Y. A tension spring 27 attached to the rule 25 causes this rule to lie on the plotting surface 5 of the drum 3. The spring 27 is fixed to a pin 28 of a slide 29 which is guided for straight motion parallel to the drum axis X—X on the slide 8. The axis of the pin 28 is parallel to the axis Y—Y and lies in a plane tangential to the plotting surface 5 and parallel to the axis Y—Y. The pin 28 extends into the radial slit 30 in a lever 31 which is so keyed to the shaft 13 that, in the zero position, which the bushing 12 assumes in the drawing and in which the longitudinal line 26 on the rule 25 lies in a plane at right angles to the axis X—X, the axis of the pin 28 lies in this plane. In this zero position of the bushing 12, the index 18' indicates on the graduation 1' the angle zero. To provide that the tension of the spring 27 works as much as possible in the direction of the line 26 on the rule 25, regardless of the position of this rule relative to the drum 3, the axis of the shaft 13 is at such a distance from the said tangential plane as corresponds to the sum of the distance apart of the point of application of the spring 27 at the pin 28 from the plane containing the axis X—X and at right angles to the axis Y—Y and the magnitude $$\frac{d\pi}{4}$$

in which $d$ designates the diameter of the plotting surface 5. The bushing 12 has an axial bore in which is displaceable a stylus 32 guided in an arm 33 of the slide 8. A spring 34 presses the stylus 32 against an eccentric body 35 keyed to a shaft 36 rotatably so mounted in the side walls 1 of the housing 2 that its axis is parallel to the axis X—X. The shaft 36 can be rotated by means of a crank 37. The stylus 32 has such a length and the body 35 such an eccentricity that one rapid rotation of the shaft 36 entails one short touch of the stylus 32 on the plotting surface 5 and, consequently, the marking of a point P on this plotting surface.

When using the device, the motor 4' is started, so that the drum 3 rotates uniformly. At the very moment at which a measured range is announced by a person operating the rangefinder, the slide 8 is so adjusted by rotation of the crank 9 that the index 10 indicates this range on the scale 11, whereupon, by one complete rotation of the crank 37, the magnitude of the adjusted range is recorded by the stylus as a point P on the plotting surface 5 of the drum 3. When a plurality of such points P have been recorded, the rule 25 fixed to the bushing 12 is so adjusted relatively to the plotting surface 5 by rotation of the crank 18 that the position of the line 26 corresponds as nearly as possible to the recorded points P. Should the point P recorded last have to be assumed to be due to an incorrect range measurement, the adjustment of the rule 25 requires an adjustment of the rule 8 by means of the crank 9. The indicating device 1', 18' then shows the angle whose tangent is equal to the change of range in the time unit $$\left(\frac{dE}{dt}\right)$$

to which corresponds the position of the line 26 on the rule 25 relative to the plotting surface 5.

I claim:

1. In a gunnery calculator, a cylindrical drum rotatable about its axis, means for rotating said drum, a slide displaceable along the axis of said drum, means for adjusting said slide relatively to said drum, a flexible rule developable in a plane and presenting a line, said line being straight in the development of said rule in a plane, a portion of said rule lying smoothly on a portion of the cylindrical surface of said drum, said rule being mounted on said slide for rotation about an axis passing through said line and intersecting the axis of said drum at right angles, and tensional means for smoothing said rule on said drum.

2. In a gunnery calculator, a cylindrical drum rotatable about its axis, means for rotating said drum, a slide displaceable along the axis of said drum, means for adjusting said slide relatively to said drum, a transparent and flexible blade, a portion of said blade lying smoothly on a portion of the cylindrical surface of said drum, said blade being mounted on said slide for rotation about an axis intersecting the axis of said drum at right angles, said blade being developable in a plane and bearing a line, said line intersecting the axis of rotation of said blade and being straight in the development of said blade in a plane, and tensional means for smoothing said blade on said drum.

3. In a gunnery calculator, a plotting device comprising a cylindrical drum rotatable about its axis, means for uniformly rotating said drum, a slide displaceable along the axis of said drum, means for adjusting said slide relatively to said drum, a stylus for marking points on the cylindrical surface of said drum, said stylus being disposed in said slide, a transparent and flexible blade, a portion of said blade lying smoothly on a portion of said surface, said blade being mounted on said slide for rotation about an axis containing the point of said stylus and intersecting the axis of said drum at right angles, said blade being developable in a plane and bearing a line, said line intersecting the axis of rotation of said blade and being straight in the development of said blade in a plane, and tensional means for smoothing said blade on said drum.

KARL PAPELLO.